Feb. 15, 1966

L. M. ADAMS 3,235,151

EPICYCLIC FILM TRANSPORT

Filed Sept. 20, 1963

INVENTOR
LLOYD M. ADAMS

BY *Beale and Jones*

ATTORNEYS

Feb. 15, 1966 L. M. ADAMS 3,235,151
EPICYCLIC FILM TRANSPORT
Filed Sept. 20, 1963 3 Sheets-Sheet 2

INVENTOR
LLOYD M. ADAMS

BY Beale and Jones
ATTORNEYS

Feb. 15, 1966 L. M. ADAMS 3,235,151
EPICYCLIC FILM TRANSPORT
Filed Sept. 20, 1963 3 Sheets-Sheet 3

INVENTOR
LLOYD M. ADAMS

BY *Beale and Jones*

ATTORNEYS

United States Patent Office 3,235,151
Patented Feb. 15, 1966

3,235,151
EPICYCLIC FILM TRANSPORT
Lloyd M. Adams, Santa Ana, Calif., assignor to Flight Research, Incorporated, Richmond, Va., a corporation of Virginia
Filed Sept. 20, 1963, Ser. No. 310,295
9 Claims. (Cl. 226—71)

This invention relates to an intermittent film feeding device and more particularly to an epicyclic feeding device for intermittently engaging the perforations of a film strip.

An object of the invention is to provide a mechanical device of simple design and construction for intermittently moving a motion picture film strip without the use of levers, slides, pivots, or anchors attached to a structural frame of a motion picture projector or camera.

Another object is to provide a device which will, through the continuous movement of its components, intermittently engage and positively advance a motion picture film strip.

Another object is to provide purely rotational means, which will, by the use of an epicyclic gearing arrangement, move the film engaging means in a circular path while maintaining these means in a desired horizontal attitude, thereby effecting the optimum contacting relation betwen the film strip and the film engaging means.

Still another object is to provide a new, useful, and counter-balanced, rotational device for intermittently advancing a motion picture film strip, which device may be mounted to the structure of a motion picture machine as an individual unit, and which requires a single rotational input.

These and other objects and advantages will become apparent to those skilled in the art upon reference to the accompanying specification, claims, and drawings, in which:

Figure 1:
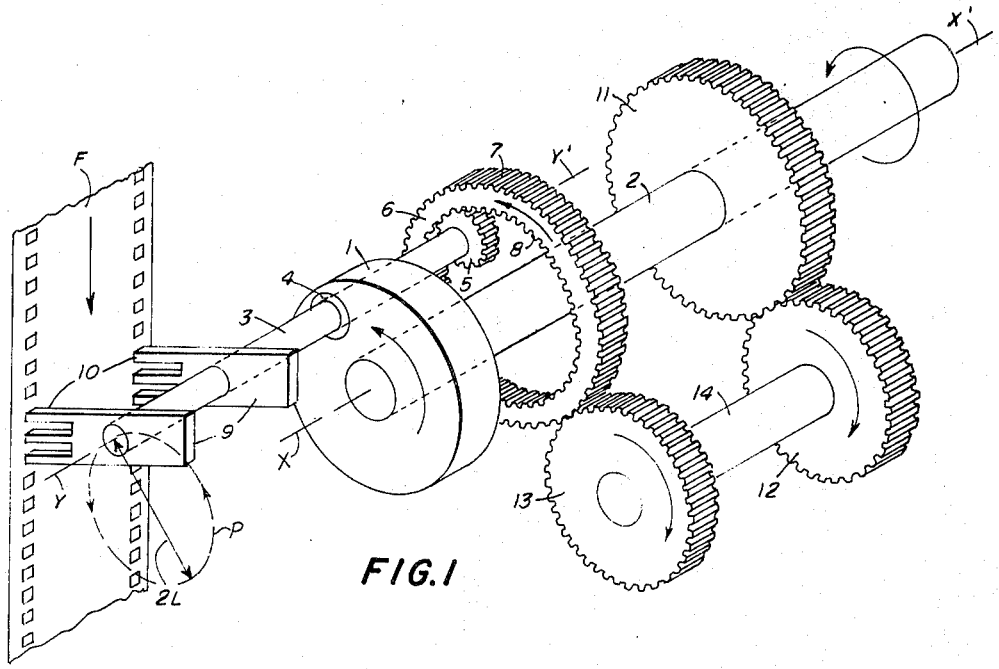
FIG. 1 is a diagrammatic perspective view, showing the relative positions of the components of the device in simplified form.

The objects of the invention will be accomplished by an intermittent film feeding device comprising a carrier element; means to rotate the carrier element about its central axis; a shaft eccentrically and rotatably mounted on the carrier element; means for controlling the rotation of the shaft about its own axis, and film engaging means mounted on the shaft.

Throughout the following description like reference numerals refer to similar parts.

Referring to the drawings, and more particularly to FIG. 1, a carrier element 1, which may be of circular configuration, is fixedly and concentrically mounted for rotation on shaft 2. Shaft 2, driven by a power source (not shown) in the direction of the arrow for film feeding, rotates about its longitudinal axis X–X'. Shaft 3, having a longitudinal axis of rotation Y–Y', is rotatably mounted as at 4, on carrier element 1, parallel and radially spaced from the axis X–X' of shaft 2 and carrier element 1. The radial spacing of the axis Y–Y' of shaft 3 from the axis X–X' of shaft 2, is of a distance L. The rotation of shaft 2, carrier element 1, and shaft 3, moves the axis Y–Y' in a circular path P. Circular path P has its center on axis X–X' and is of a diameter 2L.

Planetary gear 5 is fixedly and concentrically mounted on shaft 3. A compound gear or control element 6, having an external gear 7 and an internal gear 8, is concentrically located for rotation about the axis X–X', whereby the internal gear 8 meshes with the planetary gear 5, and rotation of compound gear or control element 6 rotates planetary gear 5 and shaft 3.

Fixedly mounted on shaft 3 to extend transversely thereto are one or more film engaging means 9. As shown for illustrative purposes in FIG. 1, the film engaging means are rectangular and are provided with one or more teeth or claws 10 for engagement with perforations adjacent each edge of a film strip F. The film engaging means 9 are mounted on shaft 3 in a substantially horizontal attitude, as shown in FIG. 1, with their vertical planes perpendicular to the axis Y–Y'. The film engaging means 9 are thereby disposed in a substantially perpendicular relationship to film strip F and the film engaging teeth 10 are then disposed in an optimum film engaging position.

Suitable means are provided to rotate compound gear 6. As shown in FIG. 1, drive gear 11, mounted for rotation on shaft 2, drives gear 12. Gear 13, mounted for rotation simultaneously with gear 12 on common shaft 14, meshes with external gear 7 of compound gear 6.

An epicyclic gearing arrangement may be generally defined as a train of gears in which some or all of the gears have a motion compounded by a rotation about an axis and a revolution or translation of that axis. The above portion of the specification briefly describes the epicyclic gearing arrangement of the invention which is noted to comprise a shaft 3 having an axis of rotation Y–Y', a planetary gear 5 concentrically mounted thereon, means to rotate gear 5 about the axis Y–Y', and means to rotate or translate shaft 3 and its axis Y–Y'.

It will be recognized by those skilled in the art, that the above results may be attained by employing a planetary gear oriented externally of the compound gear and revolving outside thereof. However, the rotational velocities of the gears and shafts required in such a system would greatly reduce the dynamic efficiency of operation of the mechanism.

A more detailed construction of the specific embodiment of the invention, as shown in FIGS. 2 through 6, will be described.

Figure 2:
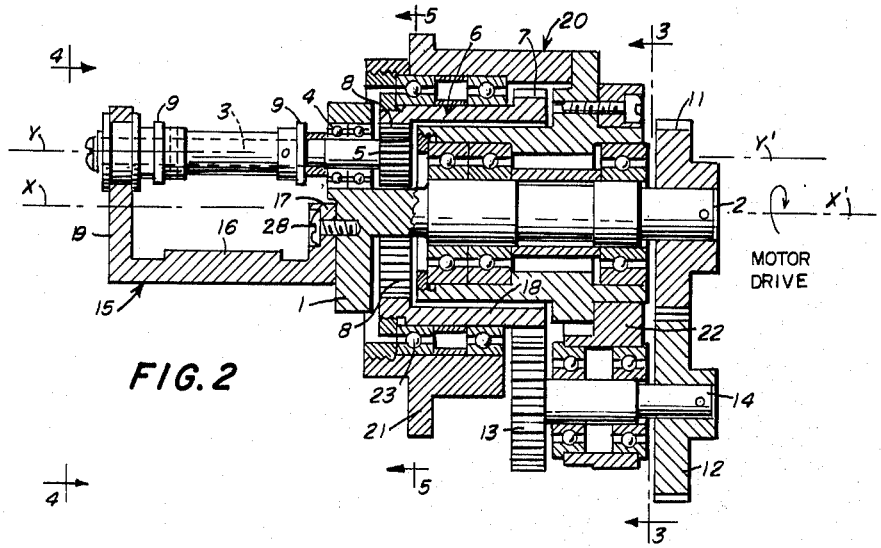
FIG. 2 is a sectional view taken along line 2—2 of FIG. 4 showing the film transport mechanism embodying the principle of the mechanism shown in FIG. 1.
Figure 3:
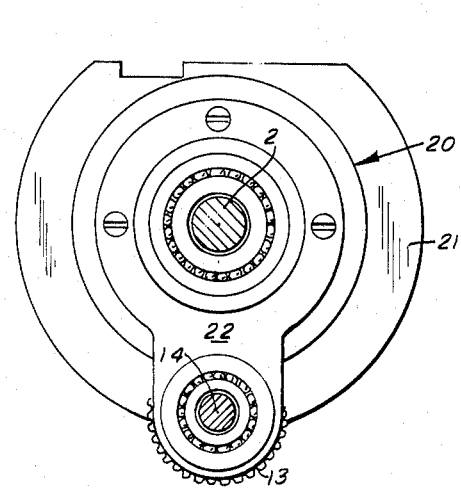
FIG. 3 is a sectional view taken along line 3—3 of FIG. 2.

FIG. 2 shows a cross-section of the film feeding transport, wherein a counter-balancing element, generally designated 15, is provided to ensure perfect dynamic balance of the carrier element 1 and the associated components throughout the feeding operation. Counter-balancing element 15 is generally of U-shaped configuration and is comprised of an intermediate longitudinal portion 16, a mounting leg portion 17, and a support leg portion 19. A cap screw 28 or other suitable means are provided to rigidly secure portion 17 to carrier element 1. Support portion 19, which is longer than portion 17, rotatably receives and supports in a transverse manner the end of shaft 3. The film engaging means 9, mounted on shaft 3, intermediate carrier element 1 and support portion 19, are thereby bridged by the counter-balancing element 15.

Vibration, deflection, and subsequent mislocation of the unsupported teeth 10 with respect to the perforations in the film strip F are eliminated by disposing the mass of the counter-balancing element 15, in particular the portion 16, diametrically opposite that of the film engaging means 9 and shaft 3.

This disposition must be such as to allow the film engaging means 9, when moving in the circular path P, to pass freely and without interference within the bridge formed by the U-shaped counter-balancing element 15. This disposition is effectively shown in FIG. 6, where the shaft 3 and film engaging means 9 are in their most remote position from the film strip F, and counter-balancing element 15 is diametrically opposite and positioned intermediate the film engaging means 9 and the film strip F.

Figure 4:
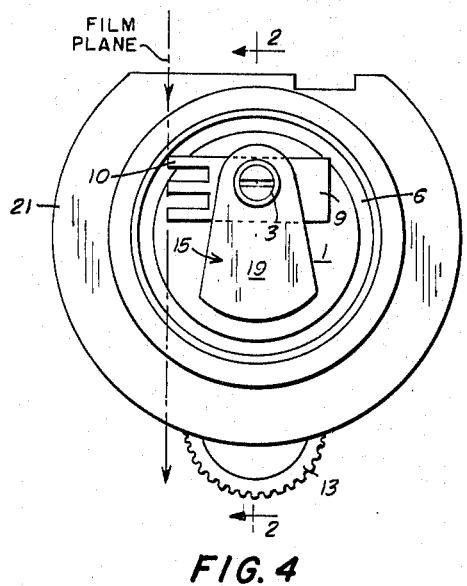
FIG. 4 is a front elevational view looking from the left of FIG. 2.
Figure 5:
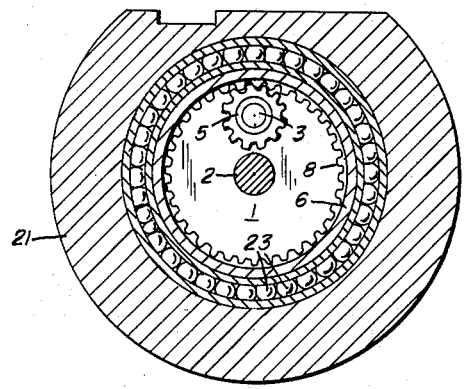
FIG. 5 is a sectional view taken along line 5—5 of FIG. 2.
Figure 6:
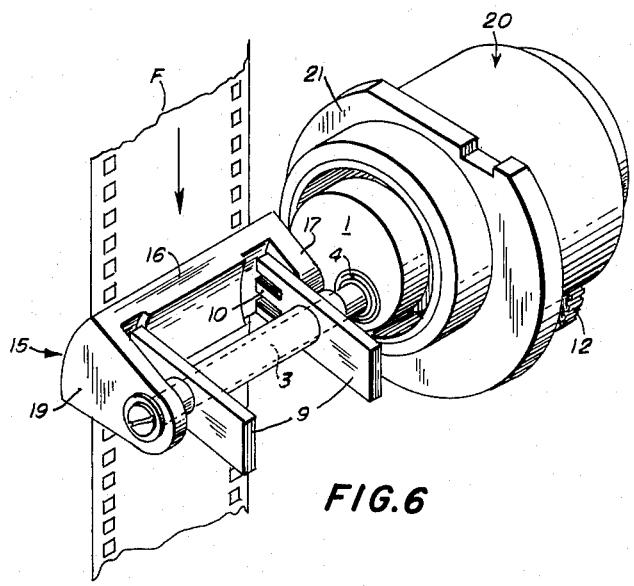
FIG. 6 is a perspective view of the embodiment of the device.

In FIG. 4 the shaft 3 is shown in its most vertical position, at the top point of the circular path P. In this position the counter-balancing element 15 subtends the film engaging means 9 and shaft 3, and demonstrates additionally that throughout the rotation of carrier element 1, counter-balanced support is provided for efficient operations.

The method of mounting the various rotating components, the drive means for shaft 2 and compound gear 6, and a housing for the mechanism is a matter of choice, and the objects of the invention will be achieved by any suitable means. However, for optimum compactness of design, shaft 3 is mounted for rotation by suitable bearings as at 4 (FIG. 2). Compound gear 6, having external gear 7 at one end and internal gear 8 at the other end, is of cylindrical shape having an extension 18 spacing apart gears 7 and 8 respectively. Compound gear 6 is mounted for rotation within a surrounding housing 20 by bearings 23 disposed therebetween. Additional bearings support the remaining rotating components.

Housing 20 may be provided with a flange 21 for suitably securing the film feeding transport within a motion picture projector or camera. Plate 22, suitably configured, is provided for the support of shaft 14.

As noted, the drive means and the support and housing means for the various components may be a matter of choice so long as the operation of the epicyclic film transport remains substantially as explained hereinafter.

In the operation of the epicyclic film transport, as best shown in the diagrammatic perspective view of the components of the invention in simplified form in FIG. 1, the rotation of shaft 2 in the direction indicated by the arrow results in the following simultaneous actions: gear 11 drives gears 12 and 13 to rotate compound gear or control element 6 in the direction indicated by the arrow thereon; carrier element 1 rotates with shaft 2 and carries the axis Y–Y' of shaft 3 in a circular path P of diameter 2L. As the film engaging means 9 are fixedly mounted on shaft 3, any point on the film engaging means 9 also moves in a circular path similar to the path P shown in FIG. 1. A full turn of shaft 2 rotates shaft 3 and its attached parts a full turn in the path P of diameter 2L. As compound gear 6 is rotated part of a turn, through the rotation of gears 11, 12 and 13, the internal gear 8 of compound gear 6 drives the plantetary gear 5 such that the instantaneous radial position about axis Y–Y' of any point on gear 5 is determined by the combined rotation to the shaft 2 and compound gear 6. With a constant input rotation to the shaft 2, the speed of rotation of compound gear 6 is seen to be dependent upon the ratios of gears 11, 12, and 13.

The position of any point on gear 5 and correspondingly the position of any point on film engaging means 9, can be selected and maintained in such a manner that film engaging means 9 remain in the horizontal attitude shown in FIG. 1 throughout a complete cycle of the mechanism. Any point on film engaging means 9 revolves about the axis X–X' of shaft 2 while having no rotation about axis Y–Y' of shaft 3 due to the controlled rotation of shaft 3 by means of the controlled rotation of compound gear 6.

By such an operation, the film engaging means 9 also move in a circular path about the axis X–X' of shaft 2 while being maintained at a horizontal attitude and therefore perpendicular to the film strip F at all times. The film strip F is thereby engaged at the top of the vertical centerline of the circle of travel of film engaging means 9 and released at the bottom, engaging and transporting the film strip F for one-half cycle and leaving it stationary for the other half cycle, and thereby providing intermittent film feeding. The counter-balancing element 15, being disposed directly opposite to the position of shaft 3 with respect to carrier element 1, is rotated between the film engaging means 9 and the film strip F during the one-half cycle when the film strip F is stationary and thereby provides counter-balanced support without any interference with the film feeding.

In order for the film engaging means to remain horizontal at all times, planetary gear 5 must be prevented from rotating about axis Y–Y' during the rotation of shaft 2 and carrier element 1, and the translation of axis Y–Y'. This is accomplished by rotating planetary-differential gear 5 a predetermined amount with respect to a revolution of shaft 2.

Figure 7:
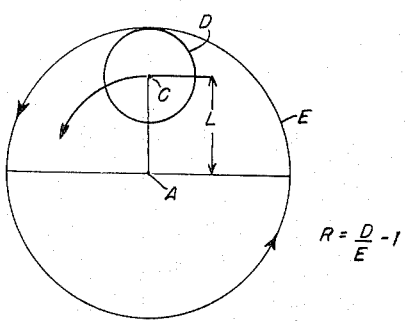
FIG. 7 is a diagrammatic representation illustrating the dimensional relationship of the epicyclic components of the invention.

FIG. 7 is a diagrammatic representation illustrating the dimensional relationship of the epicyclic components of the invention. D represents the pitch diameter circle of planetary gear 5, and E represents the pitch diameter circle of the internal gear 8. A is the center of the pitch diameter circle E and is coincident with axis X–X'. C represents the center of the pitch diameter circle D and is coincident with axis Y–Y'. L represents the radial displacement of point C from point A and corresponds to the radial displacement of axis Y–Y' from X–X'. The required rotation of compound gear 6 to accomplish the operation of the invention is determined by solving for R in the formula:

$$R = \frac{D}{E} - 1$$

in which:

$D$ = pitch diameter or size of planetary gear 5
$E$ = pitch diameter or size of internal gear 8 of compound gear 6
$R$ = the rotation of gear 6 per revolution of shaft 2 required to prevent rotation of planetary gear 5 about point C or axis Y–Y'.

The solution resulting from the above formula is general and therefore applicable to any ratio between planetary gear 5 and internal gear 8 of compound gear 6. The diameter 2L is the total vertical displacement of the film strip F per cycle.

Thus it will be apparent to those skilled in the art that the apparatus of this invention provides an intermittent film feeding transport having the characteristics of simplicity of design, smoothness of operation, long life and high speed capability. The purely rotational motions are achieved, along with theoretically perfect dynamic balance, without the use of any links, levers, slides, or pivots to any stationary frame in the system.

The specific embodiment of the invention shown in the drawings is not by way of limitation, and it is intended that the invention be defined by its objects and the scope of the claims.

What is claimed is:
1. An intermittent film feeding device comprising
a carrier element,
means to rotate said carrier element about its central axis,
a shaft eccentrically and rotatably mounted on said carrier element,
means for controlling the rotation of said shaft about its own axis as it is carried in a circular orbit by the rotation of said carrier element,
film engaging means fixedly mounted on said shaft, whereby the rotation of said carrier element about its central axis results in the controlled rotation of said shaft about its axis thereby causing said film engaging means to move in said orbit in such a manner as to maintain the film engaging means in a fixed attitude with respect to the film, said film engaging means remaining in engagement with the same portion of the film during the particular intermittent advancement of the film.

2. An intermittent film feeding device comprising,
   a carrier element,
   means to rotate said carrier element about its central axis,
   a shaft eccentrically and rotatably mounted on said carrier element,
   means for controlling the rotation of said shaft about its own axis as it is carried by the rotation of said carrier element in a circular orbit,
   film engaging means fixedly mounted on said shaft, said film engaging means being adapted for transverse slidable engagement into and out of perforations in the film,
   said film engaging means remaining in engagement with the same perforations in the film during the particular intermittent advancement of the film and
   counter-balancing means fixedly connected to said carrier element and rotatably connected to said shaft and disposed in spaced relation to said film engaging means,
   whereby the rotation of said carrier element and the controlled rotation of said shaft cause the film engaging means to move in a circular orbit and intermittently engaging the film in a fixed attitude with respect to the film.

3. An intermittent film feeding device comprising
   a carrier element having a central axis,
   means to rotate said carrier element in a first direction about its central axis,
   a shaft rotatably mounted on said carrier element and having a longitudinal axis radially spaced from the central axis of said carrier element,
   a planetary gear fixedly mounted on said shaft,
   a control element rotatable about an axis common with the axis of rotation of said carrier element and having an internal gear meshing with said planetary gear,
   means to rotate said control element about said common axis in said first direction,
   said carrier element and said control element being rotated simultaneously,
   film engaging means fixedly mounted on said shaft,
   whereby the simultaneous rotation of said carrier element and said control element moves said shaft in a circular orbit, while controlling the rotation of said shaft about its longitudinal axis in such a manner as to maintain the film engaging means in a fixed attitude with respect to the film, thereby moving said film engaging means in said circular orbit and intermittently engaging a film strip, said film engaging means remaining in engagement with the same portion of the film strip during the particular intermittent advancement of the film.

4. An intermittent film feeding device comprising
   a first shaft having a longitudinal axis,
   means to rotate said first shaft in a counter clockwise direction about said longitudinal axis,
   a carrier element concentrically and fixedly mounted on said first shaft,
   a second shaft rotatably mounted on said carrier element and having a central longitudinal axis radially spaced from said first longitudinal axis of said first shaft,
   a planetary gear fixedly mounted on said second shaft,
   a control element rotatable about an axis common to said first longitudinal axis of said first shaft and having an internal gear and an external gear, said internal gear meshing with said planetary gear,
   means meshing with the external gear of said control element to rotate said control element in a counterclockwise direction about said common axis,
   film engaging means fixedly mounted on said second shaft,
   whereby the simultaneous rotation of said carrier element and control element moves said second shaft in a circular orbit while controlling rotation of said second shaft about its longitudinal axis in such a manner as to maintain the film engaging means in a fixed attitude with respect to the film, thereby moving said film engaging means in said circular orbit and intermittently engaging a film strip, said film engaging means remaining in engagement with the same portion of the film strip during the particular intermittent advancement of the film.

5. An intermittent film feeding device comprising
   a first shaft having an axis therethrough,
   means to rotate said first shaft in a counterclockwise direction about said longitudinal axis, said first shaft having a longitudinal axis therethrough,
   a carrier element concentrically and fixedly mounted on said first shaft,
   a second shaft rotatably mounted on said carrier element and having a central longitudinal axis radially spaced from said first longitudinal axis of said first shaft,
   a planetary gear fixedly mounted on said second shaft,
   a control element rotatable about an axis common to said first longitudinal axis of said first shaft and having an internal gear and an external gear, said internal gear meshing with said planetary gear,
   drive means meshing with the external gear of said control element to rotate said control element in a counterclockwise direction about said common axis upon counterclockwise rotation of said carrier element,
   film engaging means fixedly mounted on said second shaft,
   counter-balancing means fixedly connected to said carrier element and rotatably connected to said second shaft at a point remote from the rotatable mounting of said second shaft on said carrier element and disposed in spaced relation to said film engaging means,
   whereby the simultaneous rotation of said carrier element and said counter-balancing means and said control element moves said second shaft in a circular orbit while permitting rotation of said second shaft about its longitudinal axis in such a manner as to maintain the film engaging means in a fixed attitude with respect to the film, thereby moving said film engaging means in a circular orbit and intermittently engaging a film strip, said film engaging means remaining in engagement with the same portion of the film strip during the particular intermittent advancement of the film.

6. A device of claim 5, wherein said drive means meshing with the external gear of said control element comprise gearing means driven by said first shaft, the device being entirely operative by the rotation of said first shaft.

7. An intermittent film feeding device comprising a first shaft having a longitudinal axis therethrough, means to rotate said first shaft in a counterclockwise direction about said longitudinal axis, a carrier element concentrically and fixedly mounted on said first shaft, a second shaft rotatably mounted on said carrier element and having a central longitudinal axis radially spaced from said first longitudinal axis of said first shaft, a planetary gear fixedly mounted on said second shaft, a control element rotatable about an axis common to said first longitudinal axis of said first shaft and having an internal gear and an external gear, said internal gear meshing with said planetary gear, drive means meshing with the external gear of said control element to rotate said control element in a counterclockwise direction about said common axis upon counterclockwise rotation of said element, film engaging means fixedly mounted on said second shaft, counter-balancing means fixedly connected to said carrier element and rotatably connected to said second shaft and disposed in spaced relation to said film engaging means, whereby the simultaneous rotation of said carrier element and said counterbalancing means and said control element moves said second shaft in a circular orbit thereby moving said film engaging means in a circular orbit and intermittently engaging a film strip in a fixed attitude with respect to the film, said counter-balancing means comprising a unitary U-shaped member having a first leg, a second leg, and a longitudinal portion disposed therebetween, said first leg fixedly connected to said control element, said second leg rotatably connected to said second shaft, said film engaging means mounted on said second shaft intermediate said second leg and said carrier element, said longitudinal portion of the balancing means disposed radially opposite and extending in parallel spaced relation to the longitudinal axis of said second shaft, the distance from the axis of said second shaft to the most proximal point on the longitudinal portion of said counterbalancing means being greater than the distance from the axis of said second shaft to the most distal point on said film engaging means.

8. An intermittent film feeding device comprising a first shaft having a longitudinal axis therethrough, means to rotate said first shaft in a counterclockwise direction about said longitudinal axis, a carrier element concentrically and fixedly mounted on said first shaft, a second shaft rotatably mounted on said carrier element and having a central longitudinal axis radially spaced from said first longitudinal axis of said first shaft, a planetary gear fixedly mounted on said second shaft, an annular control element rotatable about an axis common to said first longitudinal axis of said first shaft, said annular control element having an internal portion drivingly engaging said planetary gear fixedly mounted on said second shaft, drive means engaging said annular control element to rotate said control element in a counterclockwise direction about said common axis upon counterclockwise rotation of said carrier element, film engaging means fixedly mounted on said second shaft, counter-balancing means fixedly connected to said carrier element and rotatably connected to said second shaft and disposed in spaced relation to said film engaging means for movement to counter-balance the movement of said film engaging means whereby the simultaneous rotation of said carrier element and said counter-balancing means and said control element moves said second shaft in a circular orbit thereby moving said film engaging means in a circular orbit and intermittently engaging a film strip in a fixed attitude with respect to the film.

9. A device as set forth in claim 8 wherein said counterbalancing means comprises a unitary U-shaped member having a first leg, a second leg, and a longitudinal portion disposed therebetween, said first leg fixedly connected to said control element, said second leg rotatably connected to said second shaft, said film engaging means mounted on said second shaft intermediate said second leg and said carrier element, said legs of the counterbalancing means being of such length with respect to the film engaging means as to position said longitudinal portion disposed between the legs radially outside of said film engaging means.

References Cited by the Examiner
UNITED STATES PATENTS

| | | | |
|---|---|---|---|
| 1,246,198 | 11/1917 | Wenderhold | 226—81 X |
| 1,980,220 | 11/1934 | Morton | 226—81 |
| 2,712,771 | 7/1955 | Isom | 226—71 |
| 2,962,907 | 12/1960 | Dyatt | 226—71 |

M. HENSON WOOD, Jr., *Primary Examiner.*

ROBERT B. REEVES, *Examiner.*